United States Patent [19]

Wentzell

[11] Patent Number: 4,482,076
[45] Date of Patent: Nov. 13, 1984

[54] NOZZLE PLUG FOR SUBMERSIBLE VESSEL

[75] Inventor: Timothy H. Wentzell, South Windsor, Conn.

[73] Assignee: Combustion Engineering, Inc., Windsor, Conn.

[21] Appl. No.: 349,565

[22] Filed: Feb. 17, 1982

Related U.S. Application Data

[63] Continuation of Ser. No. 8,660, Feb. 2, 1979, abandoned.

[51] Int. Cl.³ .............................................. F16L 55/12
[52] U.S. Cl. .................................... 220/232; 138/93; 217/78; 277/34
[58] Field of Search .......................... 277/23, 34, 34.3; 220/225, 232; 217/78; 138/93, 89

[56] References Cited

U.S. PATENT DOCUMENTS

| | | | |
|---|---|---|---|
| 694,171 | 2/1902 | Mink | 217/78 |
| 2,366,911 | 1/1945 | Laird | 220/225 |
| 2,604,224 | 7/1952 | Howe | 217/78 |
| 2,697,534 | 12/1954 | Topley | 217/78 |
| 2,714,024 | 7/1955 | Greene | 277/2 |
| 3,343,708 | 9/1967 | Haas | 220/225 |
| 3,371,986 | 3/1968 | Brown | 220/232 |
| 4,342,336 | 8/1982 | Satterthwaite | 138/93 |

Primary Examiner—Robert I. Smith
Attorney, Agent, or Firm—Arthur E. Fournier, Jr.

[57] ABSTRACT

A plug means for effecting a temporary blockage of a passage through which liquid is designed to flow. The subject plug means includes a frame means capable of being readily disassembled and embodying in the assembled state dimensions corresponding to the cross-sectional dimensions of the passage in which the plug means is to be employed, and inflatable means mountable on the frame means and co-operable therewith for providing a liquid tight seal in the passage. The frame means comprises a frame member including a plurality of readily interconnectable sections of plate, the latter each possessing a high strength-to-weight ratio; interconnecting means for effecting the interconnection of the plurality of plate sections; and securing means cooperable with means provided in the side walls of the passage for securing the frame means and thereby the plug means in the passage in blocking relation thereto. The inflatable means includes at least one resilient member that is provided with a rim in the form of an inflatable bead. The inflatable means is mountable on the frame member so as to be positionable substantially in circumferentially enveloping relation relative thereto. The inflatable means further includes an externally accessible inflation means connected to the inflatable bead, and operable to effect the inflation thereof.

8 Claims, 11 Drawing Figures

NOZZLE PLUG FOR SUBMERSIBLE VESSEL

This is a continuation of application Ser. No. 8660 filed Feb. 2, 1979, now abandoned.

BACKGROUND OF THE INVENTION

This invention relates to plugs of the type that are employable in a passage to effect the blockage of liquid therethrough, and more particularly to a nozzle plug that is capable of being used to provide a temporary liquid tight seal of the inlet nozzle and/or outlet nozzle of a steam generator of the kind that is cooperatively associated with a nuclear reactor in a conventional nuclear power generating system.

It has long been known in the prior art to employ a plug to effect the blockage of a normally open passage, when for some particular reason such action is deemed necessary. Moreover, the prior art is known to be replete with examples of various forms of plugs, which differ one from another in terms of configuration, mode of construction, etc. On the other hand, even though a multiplicity of plugs of different design exist in the prior art, there continue to arise applications wherein it would be desirable to be able to employ a plug, however, due to the peculiar nature of the application, the plugs of known design, which are presently available, are unsuitable for use therein.

One such application involves the accomplishment of the blockage of the inlet nozzle and/or the outlet nozzle of a steam generator, the latter being of the type that is suitable for employment in cooperative association with a nuclear reactor to form therewith a component part of a nuclear power generting system. The steam generator to which reference is had here may, for purposes of this discussion, be construed as constituting simply a closed shell, which has formed therein a means through which fluid enters the steam generator and another means through which fluid exits from the the steam generator. These means comprise, more specifically, an inlet nozzle and an outlet nozzle, respectively.

Periodically, there arises a need to conduct maintenance on and/or to effect minor repairs of the internal components of the steam generator. To accomplish such tasks, it is necessary for one or more persons to actually physically enter the steam generator. Ingress into and egress from the steam generator by such persons is accomplished through suitable means such as for instance a manhole, etc., that has been provided for this purpose. While such persons are working in the steam generator, it is desirable that a blockage of the inlet nozzle and the outlet nozzle of the steam generator be effected to insure that there will be no fluid flow through the steam generator, which might imperil the lives of the people working therein.

A nuclear power generating system is designed to be operative, i.e., on line, 24 hours a day, 365 days a year. Whenever the nuclear power generating system is not operating, i.e., is shut down, either as a result of a malfunction in some part of the system or in accordance with a preestablished scheduled shutdown, it is imperative that the nuclear power generating system be brought back on line as soon as possible, for economic reasons if for no other. Namely, it is very time consuming as well as expensive to take a nuclear power generating system off line particularly when it is also necessary to shut down the nuclear reactor, and then return the system to an online state.

Accordingly, it is desirable, to the extent possible, that all work either in the form of normal maintenance or minor repair work involving any of the operating components of the nuclear power generating system be done at the same time to minimize the number of times that the nuclear reactor must be shut down. Consequently, the preferred operating procedure is to strive to complete all such maintenance and/or minor repair work whenever the nuclear reactor is placed in a shutdown mode in order to effect a refueling thereof. Included within the aforementioned work is any work of a maintenance or minor repair nature that needs to be done on the steam generator, and particularly on any of the internally housed components thereof. On the other hand, the accomplishment of such work should not interfere with the accomplishment of the refueling operation.

Under normal operating conditions, fluid flows through the interior of the steam generator. Consequently, before anyone can safely enter the interior of the steam generator to perform work therein, it is necessary that the fluid be drained therefrom. On the other hand, note is also taken of the fact that one of the steps that needs to be completed in the course of effecting the refueling of the nuclear reactor with which the steam generator is cooperatively associated involves the draining from the steam generator of the fluid, which during normal operations flows therethrough.

More specifically, to accomplish the refueling of the nuclear reactor, it is necessary to remove the head of the pressure vessel to expose the reactor core, which is housed in the vessel. However, before the head of the reactor pressure vessel can be removed, it is necessary to lower the level of the fluid, which for purposes of this discussion will be assumed to be water, that fills the interior of the pressure vessel. In actuality, the level of the water is lowered to a sufficient extent so as to be below the level whereat the head of the pressure vessel is joined to the pressure vessel. Even in its lowered state though, the level of the water is still sufficient to effect a covering of the reactor core. Because of the manner in which the steam generator is connected in fluid flow relation with the interior of the reactor pressure vessel, lowering the level of the water in the latter has the additional effect of draining the fluid, i.e., the water which otherwise flows to and through the interior of the steam generator.

After the head of the reactor vessel has been removed, it is once again necessary to flood the vessel with water. This is done in order to minimize the level of radiation to which the personnel that are engaged in the refueling operation are subjected. That is, the actual refueling of the reactor core is accomplished under water. Unfortunately, the aforesaid flooding of the pressure vessel has the concomitant effect of refilling the interior of the steam generator. Thus if personnel are to enter the interior of the steam generator to perform work therein while the refueling of the nuclear reactor is taking place, it is necessary to provide the inlet nozzle with a liquid tight seal while the steam generator is in a drained condition so as to block the flow, i.e., prevent water from reentering the steam generator when the pressure vessel is subsequently flooded following the removal of the head therefrom.

From the preceding discussion, it should be readily apparent that there exists a need to be able to effect a temporary blockage of the inlet nozzle and the outlet nozzle of the steam generator, i.e., to provide a liquid tight seal therein, while personnel are located in the steam generator performing work thereon. Furthermore, it has also been shown hereinabove that it is most desirable to be able to accomplish maintenance and/or minor repair work on the steam generator during those periods wherein the nuclear power generating system is in a shutdown mode. Finally, mention has also been made above of the fact that ingress to and egress from the interior of the steam generator by personnel having work to perform therein is accomplished through a means, such as a manhole, which is of limited dimension. Consequently, the blockage of the inlet nozzle and the outlet nozzle of the steam generator must be capable of being effected through the use of means, suitably dimensioned so as to be capable of being carried into the interior of the steam generator through the aforementioned manhole means.

One form of plug means, which has been employed heretofore in the prior art for purposes of effecting the temporary blockage of the inlet nozzle and/or the outlet nozzle of the steam generator has involved the usage of a diaphragm-like member designed to be suitably secured such as by means of a plurality of individual securing clamps, to a clamping ring. The inlet nozzle and the outlet nozzle each have such a clamping ring associated therewith. More specifically, there is one such clamping ring provided internally of the steam generator in juxtaposed relation to the inlet nozzle and another one located internally of the steam generator in juxtaposed relation to the outlet nozzle.

The above described form of plug means has not, generally speaking, been favorably received. There are a number of reasons for this. First of all, this form of plug means has proven to be susceptible to leaking. In many instances, the leaking has been found to be occasioned by the fact that it is difficult to achieve a liquid tight seal between the clamping ring and the diaphragm-like member. Namely, during periods of nonuse of the plug means, i.e., when the diaphragm-like member is not secured in place on the clamping ring, material becomes deposited on the surface of the clamping ring when the steam generator is in an operating mode, i.e., when fluid from the nuclear reactor is being circulated therethrough. Such material buildup on the clamping ring interferes with the accomplishment of a liquid tight seal between the diaphragm-like member and the clamping ring. Secondly, objections to the usage of this form of plug means have been raised on the part of some of the personnel, who have been assigned to work inside the steam generator with the subject plug means in place. By and large these objections have centered on two characteristics of this form of plug means; namely, the fact that the diaphragm-like member is secured on the clamping ring in such a manner that the fluid being blocked thereby exerts a force thereagainst tending to urge the diaphragm-like member out of engagement with the clamping ring, and the fact that the securing clamps are susceptible to being dislodged through the accidental engagement therewith by personnel working in the interior of the steam generator. Although the pressure of the fluid bearing against the plug means is not relatively high, the volume of fluid being blocked from entering the interior of the steam generator thereby would be sufficient to fill the interior of the steam generator, and thus in the event of a failure of the plug means would be sufficient to cause the drowning of any personnel caught within the steam generator when the plug means fails.

The above discussion should render it readily apparent that a need exists in the prior art for a plug means that would represent an improvement over known forms of plug means and for a plug means that would be particularly suited for employment for purposes of providing a temporary liquid tight sealing of the inlet nozzle and/or the outlet nozzle of a steam generator of the type that is designed to be cooperatively associated with a nuclear reactor in a nuclear power generating system of known construction. Moreover, such a plug means should embody dimensions enabling it to be carried into the interior of the steam generator through the same means, such as for instance a manhole, as that through which the steam generator interior is entered by personnel intending to work therein. Such a plug means should be further characterized by the fact that it can be secured in place within the time it takes to remove the head of the reactor vessel, and by the fact that the plug means after employment can be removed within the time it takes to replace the reactor vessel head. Preferably, such a plug means should be mountable in such a manner that the fluid being blocked thereby exerts a force thereagainst tending to urge the plug means into a blocking position. Lastly, such a plug means should be mountable in position relative to the inlet nozzle and/or the outlet nozzle of a steam generator in such a manner as to minimize the possibility of its being accidentally dislodged from its liquid tight sealing position by personnel working within the interior of the steam generator.

It is therefore an object of the present invention to provide a plug means of the type that is suitable for employment in a passage to effect the blockage of fluid therethrough.

It is another object of the present invention to provide such a plug means, which is particularly suited to be utilized for purposes of effecting a temporary liquid tight sealing of the inlet nozzle and/or the outlet nozzle of a steam generator, the latter being of the type employable with a nuclear reactor in a conventional form of nuclear power generating system.

It is still another object of the present invention to provide such a plug means, which can be readily disassembled so as to permit its passage through an opening of limited dimensions through which entry to the interior of the steam generator is normally effected.

A further object of the present invention is to provide such a plug means, which is readily capable of being secured in a blocking position relative to the inlet nozzle and/or the outlet nozzle of the steam generator within the time it takes to remove the head of the reactor vessel, and thereafter is capable of being removed from its blocking position within the time it takes to replace the head on the reactor vessel.

A still further object of the present invention is to provide such a plug means, which is capable of being mounted in a blocking position so as to effect a liquid tight sealing of the inlet nozzle and/or the outlet nozzle of the steam generator in such a manner as to render it relatively unlikely that the plug means will become accidentally dislodged by virtue of its being struck by personnel working within the interior of the steam generator.

Yet another object of the present invention is to provide such a plug means which is mountable in such a manner relative to the inlet nozzle and the outlet nozzle of the steam generator that the fluid being blocked thereby exerts a force thereagainst tending to urge the plug means into a blocking position.

Yet still another object of the present invention is to provide such a plug means that is relatively economical to manufacture, relatively easy to employ, and which is capable of providing reliable operation.

SUMMARY OF THE INVENTION

In accordance with the present invention, there is provided a novel and improved plug means that is operable for use in effecting a temporary blockage of a passage through which liquid flows, such as the inlet nozzle and/or the outlet nozzle of a steam generator of the type that forms one of the operating components of a nuclear power generating system. The subject plug means includes a plurality of interconnectable sections of plate that are capable of being assembled to form a frame member corresponding in dimensions to the cross-sectional area of the passage sought to be blocked by the plug means. The plurality of sections of plate are each of sufficiently small size as to be capable of being carried into the interior of the steam generator through the same means through which entry to the interior of the steam generator is normally effected by personnel. Moreover, each section of plate is characterized by its high strength-to-weight ratio. The sections of plate are interconnected through the use of interconnecting means in the form of fasteners that are readily disconnectable. The frame means is provided with securing means cooperable with means formed in the side walls of the nozzles of the steam generator and operable therewith to securely fasten the plug means in blocking relation relative to the corresponding steam generator nozzle so as to effect a liquid tight sealing of the latter. In addition, the subject plug means includes a pair of inflatable members, which cooperate with the aforesaid frame member. More specifically, the inflatable members, which are each provided with a rim in the form of an inflatable bead, are mountable on the frame member so as to be positionable thereon substantially in circumferentially enveloping relation thereto. Furthermore, the inflatable members are each provided with inflation means in the form of valve means having associated therewith a pressure gauge, which is connected with the inflatable bead and by means of which air is supplied to the inflatable bead to effect the inflation thereof.

DESCRIPTION OF THE ILLUSTRATED EMBODIMENTS

Figure 1:
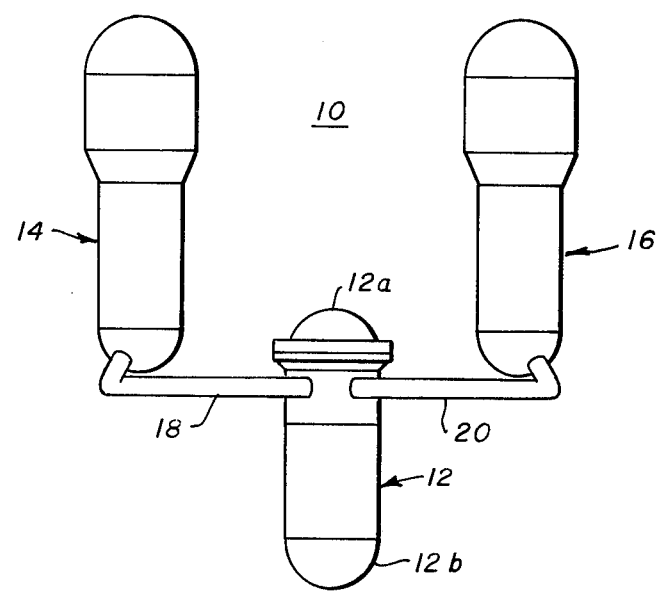
FIG. 1 is a schematic representation of a conventional type of nuclear power generating system illustrating a pair of steam generators cooperatively associated with a nuclear reactor housed in a pressure vessel.

Referring now to the drawing, and more particularly to FIG. 1 thereof, there is illustrated therein a conventional type of nuclear power generating system, the latter being designated therein generally by reference numeral 10. More specifically, the nuclear power generating system 10 includes a nuclear reactor housed in a pressure vessel 12, and a pair of steam generators 14, 16 that are cooperatively associated with the pressure vessel 12. As shown in FIG. 1, the fluid interconnection between the pressure vessel 12 and the steam generators 14, 16 is accomplished by means of conduits 18 and 20, respectively, in a manner well-known to those skilled in the art. Note should be taken herein particularly of the fact that the conduits 18 and 20 are connected to the pressure vessel 12 at points located adjacent to the point whereat the closure head 12a of the pressure vessel 12 is joined to the main body portion 12b of the vessel 12. Accordingly, when the pressure vessel 12 is drained to the requisite extent to permit the closure head 12a to be removed therefrom while at the same time maintaining a liquid coverage of the fuel assembly, the effect thereof is to also concurrently cause a draining of the steam generators 14 and 16. The significance of this fact will be pointed out with more particularity subsequently.

Figure 2:
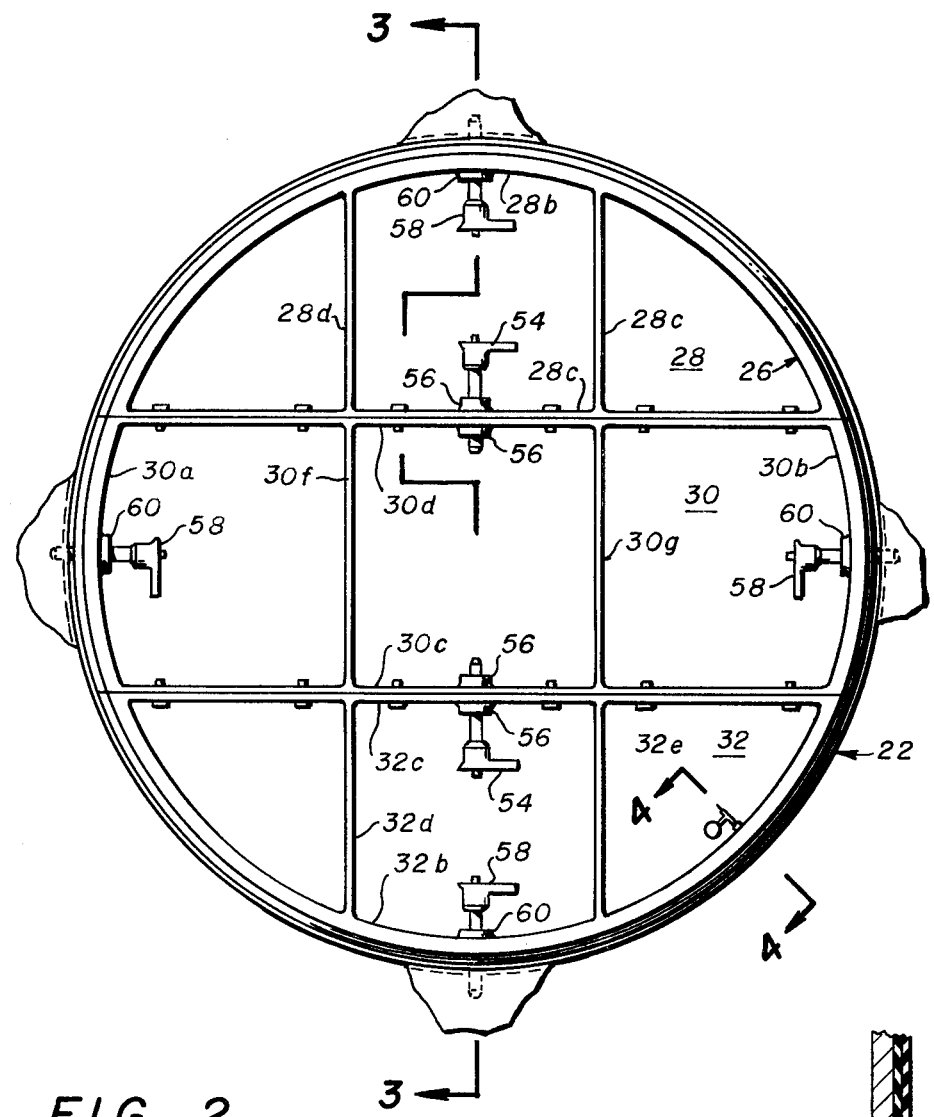
FIG. 2 is a top plan view of a first embodiment of plug means constructed in accordance with the present invention.
Figures 3, 5, 6:
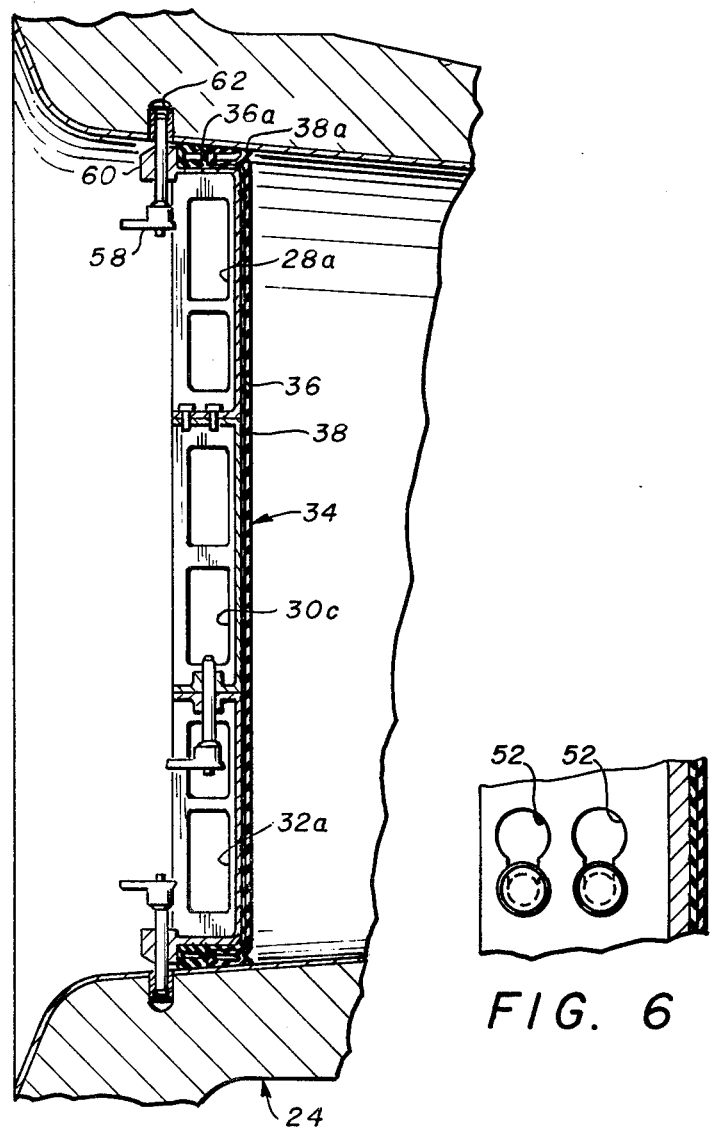
FIG. 3 is a cross-sectional view of the plug means of FIG. 2 taken substantially along the line 3—3 in FIG. 2, and illustrated mounted within a nozzle of a steam generator.
FIG. 5 is a cross-sectional view on an enlarged scale of a portion of the plug means of FIG. 2 illustrating the interconnecting means employed to effect the assembly of the plug means.
FIG. 6 is a side-elevational view on an enlarged scale of a portion of the plug means of FIG. 3 providing a further illustration of the interconnecting means employed to effect the assembly of the plug means.

With further reference to the drawing, there is to be found illustrated in FIGS. 2-6 thereof one embodiment of plug means, generally designated by reference numeral 22, constructed in accordance with the present invention, which is considered to constitute the best mode of the invention for use in those applications wherein it is desired to embody the plug means 22 in a steam generator, such as the steam generators 14 and 16 of FIG. 1, at the time that the steam generator is being initially constructed. In a manner to be more fully described hereinafter, the plug means 22 as shown particularly with reference to FIG. 3 is mountable in blocking relation within the nozzle of a steam generator. For purposes of the following description, it will be assumed that the plug means 22 is illustrated in FIG. 3 mounted within the inlet nozzle 24 of the steam generator 14, and that although not depicted in the drawing, the inlet nozzle 24 is in turn connected by means of conduit 18 in fluid flow relation with the interior of the pressure vessel 12. Moreover, it is to be understood that in its mounted position, the plug means 22 is operative to effect the blockage of fluid flowing in the conduit 18 through the establishment thereby of a liquid tight seal across the inlet nozzle 24.

Turning now to a more detailed description of the nature of the construction of the plug means 22, reference will be had for this purpose particularly to FIGS. 2 and 3 of the drawing. As depicted therein, the plug means 22 includes a frame means comprising a frame member, generally designated by reference numeral 26, that corresponds in external dimensions substantially to the internal dimensions of the inlet nozzle 24. Moreover, the frame member 26 is designed to be capable of being readily assembled and disassembled. To this end, the frame member 26 is composed of a plurality of interconnectable sections of plate that in accordance with the illustrated embodiment of FIG. 2 thereof comprises three in number, i.e., the plate sections 28, 30 and 32. It is to be understood, however, that the frame member 26 could embody a greater or a lesser number of plate sections without departing from the essence of the invention. By way of illustration, the employment of the three plate sections 28, 30 and 32 is deemed to be particularly suitable wherein the inlet nozzle 24 to be blocked thereby is substantially forty-two inches in diameter. Commonly, in a steam generator such as the steam generators 14 and 16 wherein the inlet nozzle measures substantially forty-two inches in diameter, the outlet nozzle will be somewhat smaller in size, i.e., will measure approximately thirty inches in diameter. Accordingly, a frame member consisting of only two plate sections, each embodying a configuration similar to that of the plate sections 28 and 32, has been found to be suitable for use in connection with the blockage of an outlet nozzle of the aforesaid thirty inch diameter.

Continuing with the description of the plate sections 28, 30 and 32, the plate sections 28 and 32 are each substantially semi-circular in configuration, while the plate section 30 is provided with curved ends 30a and 30b whereby when the plate sections 28, 30 and 32 are all suitably interconnected, in a manner yet to be described, so as to effect the assembly of the frame member 26, the latter embodies a substantially circular external configuration. As best understood with reference to FIGS. 2 and 3 of the drawing, the plate section 28 preferably consists of a planar base portion 28a, a pair of upstanding, interconnected side wall members 28b and 28c fixedly attached to the planar base portion 28a, and a pair of upstanding, parallelly extending ribs 28d and 28e fixedly attached to the planar base portion 28a and having their opposite ends fixedly secured to the side wall members 28b and 28c. Likewise, the plate section 32 consists of a planar base portion 32a, a pair of upstanding, interconnected side wall members 32b and 32c fixedly attached to the planar base portion 32a, and a pair of upstanding, parallelly extending ribs 32d and 32e fixedly attached to the planar base portion 32a and having their opposite ends fixedly secured to the side wall members 32b and 32c. The plate section 30 on the other hand consists of a planar base portion 30c, a pair of upstanding, parallelly extending side wall members 30d and 30e fixedly attached to the planar base portion 30c and having their opposite ends connected to the curved ends 30a and 30b of the plate section 30, and a pair of upstanding, parallelly extending ribs 30f and 30g fixedly attached to the planar base portion 30c and having their opposite ends fixedly secured to the side wall members 30d and 30e. The interconnection of the various components of each of the individual plate sections 28, 30 and 32, such as for instance the planar base portion 28a, the side wall members 28b and 28c, and the ribs 28d and 28e of the plate section 28, may be accomplished through the use of any suitable conventional method of securing members together, as for example, through the use of welding. Note is taken of the fact that in accord with the best mode of the invention the ribs 28d and 28e, 30f and 30g, and 32d and 32e of the plate sections 28, 30, and 32, respectively, are preferably not solid, i.e., have cut away portions provided therein as best seen with reference to FIG. 3 of the drawing.

Figure 4:
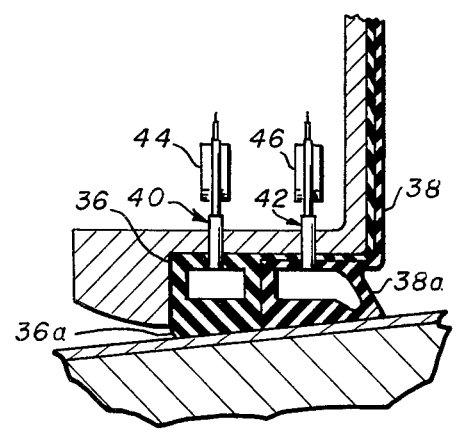
FIG. 4 is a cross-sectional view of the plug means of FIG. 2 taken substantially along the line 4—4 in FIG. 2.

With particular reference to FIGS. 3 and 4 of the drawing, the frame means of the plug means 22 further includes inflatable means, generally designated by reference numeral 34. The inflatable means 34 is comprised of a pair of resilient members 36 and 38 of substantially circular configuration. Each of the members 36 and 38, which preferably are made of a rubber like material, is of sufficient diameter as to be capable of being mounted with substantially a friction fit on the assembled frame member 26. Moreover, both of the members 36 and 38 are provided with a rim 36a and 38a, respectively, in the form of an inflatable bead, formed around the circumference thereof. As best shown in FIG. 3 of the drawing, the rims 36a and 38a, for a purpose yet to be described, preferably each embody a substantially rectangular configuration with a hollow interior.

Any suitable conventional form of inflation means may be employed for purposes of effecting the inflation of the rims 36a and 38a of the inflatable members 36 and 38, respectively. However, in accord with the illustrated embodiment of the plug means 22, and as depicted in FIG. 4 of the drawing, the inflation means that is preferably employed comprises an inflation means, which is generally similar both in function and in construction to the common tire valve by means of which the inflation of the ordinary automobile tire is accomplished. More specifically, air valve means 40 and 42 are cooperatively associated with the inflatable rims 36a and 38a, respectively, so as to be in fluid flow communication therewith. Moreover, each of the air valve means 40 and 42 preferably has associated therewith a conventional form of pressure gauge 44 and 46, respectively, by means of which the pressure of the air in the inflatable rims 36a and 38a may be measured. Suitable openings (not shown) are provided in the side wall member 32b of the plate section 32 whereby the air valve means 40 and 42 project therethrough so as to be readily accessible internally of the frame member 26 when the latter is in the assembled condition. A conventional bicycle air pump (not shown) may be utilized as the source of air such that when connected in a well-known manner to the air valve means 40 and 42, air is supplied from the pump through the latter to the rims 36a and 38a, respectively, to effect the desired inflation thereof.

To effect the assembly of the frame member 26, the plate sections 28, 30 and 32 are fastened one to another through the use of interconnecting means. As best understood with reference to FIGS. 5 and 6 of the drawing, the latter interconnecting means includes a multiplicity of suitably spaced pins 50 that are fixedly mounted, such as by being welded thereto, in the side wall members 30d and 30e of the plate section 30. The pins 50 are receivable in keyhole shaped slots 52 suitably provided for this purpose in the side wall member 28c of the plate section 28 and in the side wall member 32c of the plate section 32. Namely, the interconnection of the plate sections 28, 30 and 32 is accomplished by inserting the heads of the pins 50 in a well-known manner, into the enlarged portions of the slots 52, and thereafter moving the pins 50 relative to the slots 52 so that the stem portions of the pins 50 rest within the narrow portions of the slots 52. The disassociation of the pins 50 from the slots 52 is accomplished simply by reversing the aforedescribed procedure. Thus, it can be seen that the assembly of the frame member 26 is readily accomplished in a simple but effective manner. Once the pins 50 have been received in the slots 52 as above described, quick disconnect fasteners, generally designated by reference numeral 54, are preferably inserted in suitably dimensioned openings (not shown) formed in bosses 56 provided for this purpose in the side wall members 28c, 30d and 30e and 32c of the plate sections 28, 30 and 32, respectively. The fasteners 54 are designed to be easily and rapidly insertable into and withdrawable from the bosses 56. That is, the quick disconnect fasteners 54 which may take the form of spring loaded fasteners or ball actuatable fasteners of conventional construction well-known to those skilled in the fastener art, are inserted through the bosses 56 and are retained in place through the operation of spring means (not shown) in the case of the spring loaded fasteners and ball means (not shown) in the case of the ball actuatable fasteners. The bosses 56, as illustrated in FIG. 2, are positioned in the side wall members 28c, 30d and 30e, and 32c, so as to be axially alignable when the stem portions of the pins 50 are received within the narrow portions of the slots 52. Although a specific arrangement of pins 50 and slots 52, and fasteners 54 and bosses 56 is illustrated in FIG. 2 of the drawing, modifications therein could be made thereto without departing from the essence of the invention, such as for instance by increasing or decreasing the number of pins that are employed and/or the location of the slots 52 and the bosses 56 as long as the desired interconnection of the plate sections 28, 30 and 32 can still be achieved.

Completing the description of the plug means 22 of Figures 2-6 of the drawing, the frame member 26 is further provided with securing means comprising four equally spaced quick disconnect fasteners 58 capable of being received in retained relation in bosses 60. As best seen with reference to FIG. 2 of the drawing, a boss 60 is preferably provided in each of the side wall members 28b and 32b of the plate sections 28 and 32, respectively, and in each of the curved ends 30a and 30b of the plate section 30 so as to be centrally located within the side wall members 28b and 32b and the curved ends 30a and 30b. The fasteners 58 in addition are designed to be received in openings 62 provided for this purpose in the side walls of the inlet nozzle 24 as shown in FIG. 3. More specifically, the plug means 22 is secured in mounted relation within the inlet nozzle 24 by virtue of the insertion of the free ends of the fasteners 58 in the openings 62. Preferably, the fasteners 58 are of the same type as the fasteners 54, the latter having been described previously hereinabove.

The preferred manner of employment of the plug means 22 will now be described. One of the primary usages intended for the plug means 22 is that of establishing a liquid tight seal therewith across the inlet nozzle 24 and the outlet nozzle (not shown) of a steam generator, such as the steam generators 14 and 16 depicted in FIG. 1, the latter being cooperatively associated with a nuclear reactor housed within a pressure vessel 12. The reason for establishing such a liquid tight seal is to insure that there will be no liquid flow from the pressure vessel 12 into the interior of the steam generators 14 and 16. Accordingly, any repair or maintenance work required to be performed within the steam generators 14 and 16 can be safely accomplished, i.e., personnel can enter the aforesaid steam generators to perform such tasks without fear that the interior of the steam generators 14 and 16 will become flooded by virtue of liquid flowing thereinto from the pressure vessel 12 while the personnel are still inside the steam generators 14 and 16.

More specifically, the procedure which would be employed would be as follows. Normally, any work to be performed on the interior of the steam generators 14 and 16 would be scheduled so as to be done during a period when the nuclear reactor is shut down for refueling. Assuming this to be the situation in which it is desired to utilize the plug means 22, the first step would be to accomplish a partial draining of the fluid within the interior of the pressure vessel 12 preparatory to commencing the removal of the closure head 12a from the pressure vessel 12 to provide access to the nuclear reactor core. As a consequence of this partial draining of the pressure vessel 12, there is simultaneously effected a draining of fluid from the interior of the steam generators 14 and 16. Once the steam generators 14 and 16 have been drained and while the closure head 12a of the pressure vessel 12 is being removed, the intent is to have personnel enter the steam generators 14 and 16 through the manholes (not shown) provided therein for this purpose and install a plug means 22 in each of the nozzles thereof, whereby a liquid tight seal is established therein so that once the level of the liquid is raised in the pressure vessel 12 so as to enable the refueling operation to proceed in a conventional manner, fluid entering the conduits 18 and 20 which interconnect the steam generators 14 and 16 to the pressure vessel 12 will be prevented by the existence of the plug means 22 from entering the steam generators 14 and 16.

To this end, the plug means 22 in a disassembled state, i.e., with the frame member 26 unassembled, is carried by personnel therewith into the interior of the corresponding steam generator whereupon the frame member 26 is assembled as described hereinabove through the use of the pins 50, the slots 52 and the fasteners 54. Thereafter, also as described above, the fasteners 58 having previously been positioned in the bosses 60 are inserted into the opening 62 formed in the side walls of the nozzles to effect the mounting of the plug means 22 in the nozzles. Intermediate the interconnection of the plate sections 28, 30 and 32 and the mounting of the plug means 22 in the nozzles, it is to be understood that the rims 36a and 38a of the inflatable members 36 and 38 are inflated whereby, as best understood with reference to FIG. 3 of the drawing, a tight seal is established between the resilient members 36 and 38 and the internal surfaces of the corresponding nozzle. That is, the outer surface of the inflated rim 36a is positioned in abutting relation to the bosses 60 and the side wall of the nozzle 24, while the inflated rim 38a is similarly positioned in abutting relation to the inflated rim 36a and the adjacent side wall of the nozzle 24. Thus, a double seal is provided by the inflated rims 36a and 38a between the frame member 26 and the side walls of the nozzle 24. Further, because of the manner in which the frame member 26 is oriented relative to the inlet end of the nozzle 24, fluid flowing into the inlet nozzle 24 from the pressure vessel 12 engages the outer surface of the resilient member 38 and exerts a force thereagainst tending to urge the inflated rim 38a into engagement with the inflated rim 36a, and in turn the inflated rim 36a into engagement with the circumferential rim portions of the plate sections 28, 30 and 32. Note should be further taken of the fact that inasmuch as the resilient members 36 and 38 each span the entire external surface area of the base portions 28a, 30c and 32a when the plate sections 28, 30 and 32 are in an assembled state, the resilient members 36 and 38 are effective in preventing any leakage of liquid, which might otherwise occur at the joints between plate sections 28 and 30, and plate sections 30 and 32.

Should the repair and/or maintenance work required to be performed in the interior of the steam generators 14 and 16 be accomplished before the closure head 12a is scheduled to be replaced on the pressure vessel 12, the plug means 22 would remain installed within the nozzles. Namely, following completion of the refueling operation, it is once again necessary to lower the level of liquid in the pressure vessel 12. As before, when this occurs the liquid within the conduits 18 and 20 is also removed, i.e., the liquid bearing against the plug means 22 is drained therefrom. Thereupon, concurrent with the replacement of the closure head 12a on the pressure vessel 12 personnel can enter the steam generators 14 and 16 and remove the plug means 22 from the nozzles. Then, the plug means 22 are each disassembled, and in an unassembled condition are removed from the steam generators 14 and 16 by the personnel leaving the latter. With the plug means 22 removed, reflooding of the pressure vessel 12 is also effective to cause liquid to flow into the steam generators 14 and 16 in preparation to returning the nuclear power generating system 10 to an online status.

Figure 7:
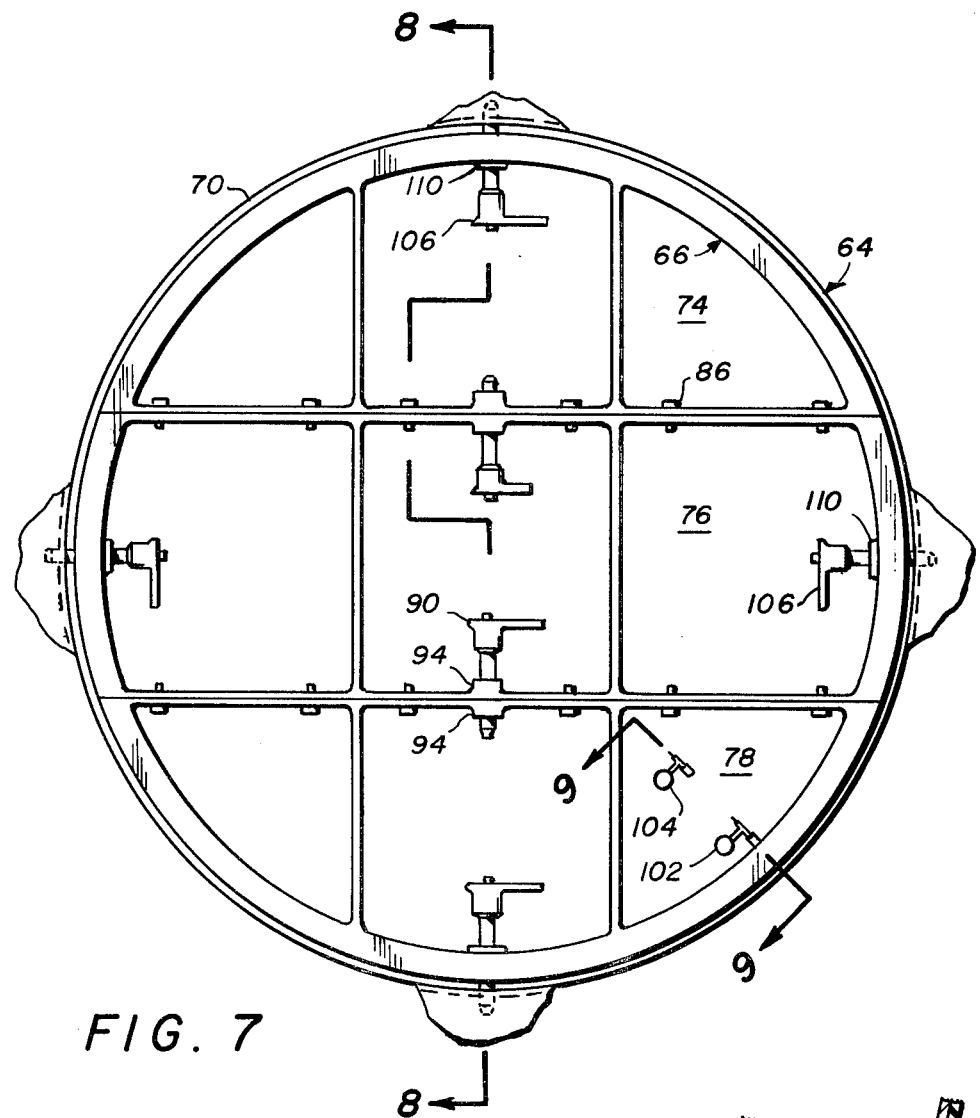
FIG. 7 is a top plan view of a second embodiment of plug means constructed in accordance with the present invention.
Figure 9:
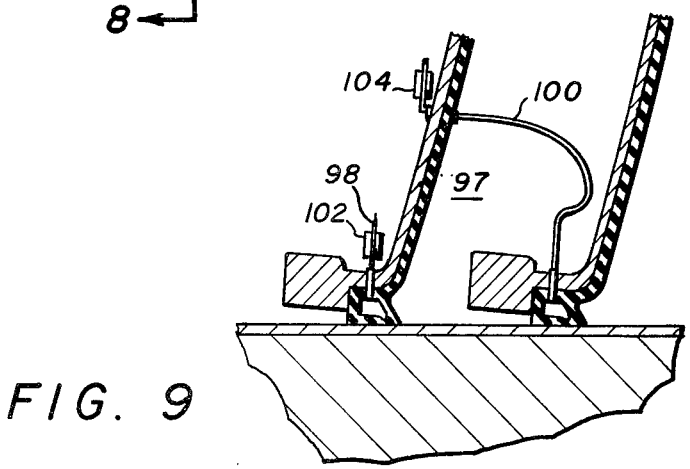
FIG. 9 is a cross-sectional view of the plug means of FIG. 7 taken substantially along the line 9—9 in FIG. 7.
Figure 8:
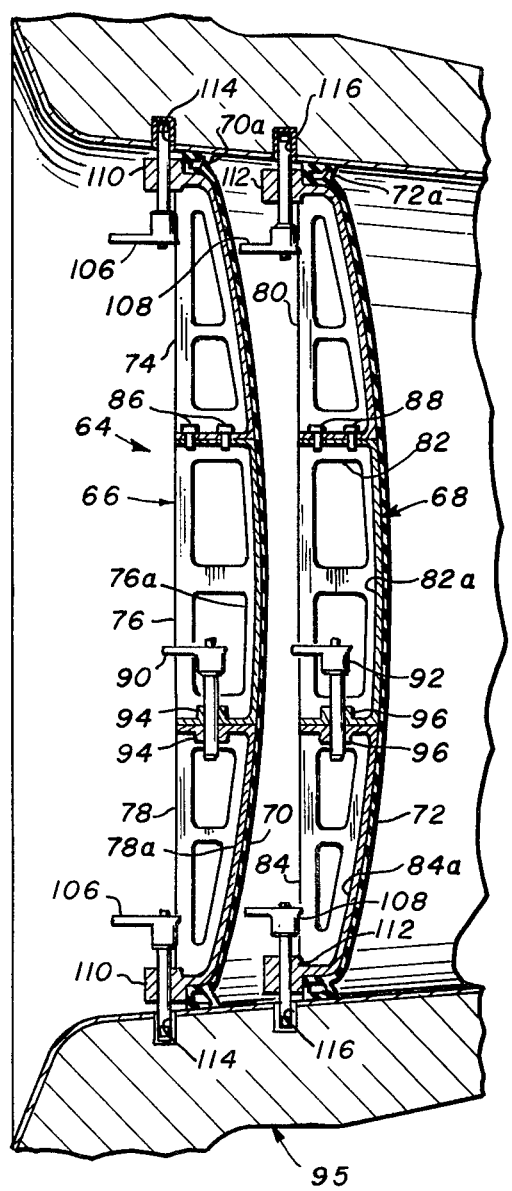
FIG. 8 is a cross-sectional view of the plug means of FIG. 7 taken substantially along the line 8—8 in FIG. 7 and illustrated mounted within a nozzle of a steam generator.

There is illustrated in FIGS. 7-9 of the drawing, a second embodiment of plug means, generally designated by reference numeral 64, constructed in accordance with the present invention. The plug means 64 is particularly suited for employment in retrofit applications; namely, for those applications wherein it is desired to equip existing steam generators with a plug means of the type that forms the subject matter of the present invention. The construction and method of employment of the plug means 64 is generally similar to that of the plug means 22, which has been described hereinbefore. The major difference between the plug means 64 and the plug means 22 resides in the fact that the former includes frame means comprising a pair of frame members 66 and 68, each of which has associated therewith a single resilient member 70 and 72, respectively, whereas the plug means 22, as previously described, embodies frame means consisting of a single frame member 26 which has a pair of resilient members 36 and 38 associated therewith. Another minor difference between the plug means 64 and the plug means 22 lies in the fact that in the assembled condition the frame members 66 and 68 of the former each embody a base having a substantially planoconvex configuration whereas the base of the frame member 26 of the latter in the assembled condition is substantially planar in configuration.

Inasmuch as the nature of the construction of the plug means 22 has been described with specificity hereinabove and inasmuch as the construction of the plug means 64 so closely resembles that of the plug means 22, it is not deemed necessary for purposes of obtaining an understanding of the plug means 64 to describe at length herein the nature of the construction thereof. Rather, a summary recitation thereof when considered in conjunction with the foregoing description of the construction of the plug means 22 is deemed to be adequate.

Accordingly, as best understood with reference to FIGS. 7 and 8 of the drawing, the plug means 64 includes a pair of frame members 66 and 68. Each of the frame members 66 and 68 in turn preferably includes three sections of plates 74, 76, 78 and 80, 82, 84, respectively. The number of plate sections, which each of the frame members 66 and 68 embodies, is a function of the cross-sectional area of the passage in which it is intended to employ the plug means 64. For purposes of the illustrated embodiment of the plug means 64, it is assumed that the latter is intended to be installed in an inlet nozzle having a forty-two inch diameter of a steam generator. Inasmuch as the outlet nozzle of a steam generator is generally smaller in diameter than an inlet nozzle thereof, i.e., the former commonly has a diameter of thirty inches, the plug means 64 would embody a lesser number of plate sections if it were to be employed to effect a liquid tight sealing of a steam generator outlet nozzle rather than that of a steam generator inlet nozzle as illustrated in FIG. 8.

Each of the plate sections 74, 78, 80 and 84 are generally similar in construction to the plate sections 28 and 32 of the plug means 22, the only difference therebetween is that the base portions 74a, 78a, 80a and 84a thereof are convex in configuration rather than being planar as in the case of the base portions 28a and 32a of the plate sections 28 and 32, respectively. Likewise, in construction the plate sections 76 and 82 are similar to the plate section 30 of the plug means 22 except that the base portions 76a and 82a of the former are convex in configuration rather than being planar as is the base portion 30c of the latter.

The plate sections 74, 76 and 78 of the frame member 66 and the plate sections 80, 82 and 84 of the frame member 68 are designed to be readily interconnectable so that the assembly and the disassembly of the frame member 66 and the frame member 68 can be rapidly and expeditiously accomplished. To this end, the frame members 66 and 68 are each provided with interconnecting means. More specifically, plate section 76 and plate section 82 each have a plurality of pins 86 and 88, respectively, fixedly mounted thereon in suitably spaced relation one to another. The pins 86 and 88 are positioned so as to be alignable with a plurality of keyhole slots (not shown) that are formed in the plate sections 74, 78, and 80, 84, respectively, for purposes of receiving the pins 86 and 88 therein in the manner of the pins 50 and the slots 52 of the plug means 22. Namely, the pins 86 and 88 and the cooperating slots (not shown) associated therewith are employed to effect the assembly and disassembly of the frame members 66 and 68 in the same manner as the pins 50 and slots 52 are employed, as described hereinabove, to effect the assembly and disassembly of the plug means 22. Also, as in the case of the plug means 22, axially alignable quick disconnect fasteners 90 and 92, identical in construction and in function to the fasteners 54 of the plug means 22, are preferably provided and are receivable within the bosses 94 and 96, respectively, to aid in effecting the interconnection of the plate sections 74, 76 and 78, and the plate sections 80, 82 and 84, respectively.

Continuing with a description of the plug means 64, the resilient members 70 and 72, to which reference has been had previously hereinabove, are each similar in construction to the resilient member 36 that is employed in conjunction with the frame member 26 of the plug means 22. That is, the resilient members 70 and 72 are each preferably formed from a rubber like material, and are of sufficient size so as to be mountable with substantially a friction fit on the frame members 66 and 68, respectively, when the latter are in an assembled state. By spanning the entire surface of the assembled frame members 66 and 68, the resilient members 70 and 72, respectively, are operable to prevent leaks from developing at the joints formed between the cooperative plate section 76 and the plate sections 74 and 78, and between the cooperative plate section 82 and the plate sections 80 and 84. As with the resilient member 36 of the plug means 22, the resilient members 70 and 72 are each provided with an inflatable rim 70a and 72a, respectively. The latter rims 70a and 72a are substantially rectangular in configuration so as to conform with the surfaces with which the rims 70a and 72a are intended to coact; namely, the rims of the assembled frame members 66 and 68, respectively, and the side wall surfaces of the inlet nozzle 95.

There is depicted in FIG. 9 of the drawing one form of inflation means, generally designated therein by reference numeral 27, that is preferably employed for purposes of effecting the inflation of the inflatable rims, i.e., beads, 70a and 72a. As illustrated in FIG. 9, the inflation means 97 is in the form of a pair of air valve means 98 and 100, the latter each being similar in construction to a conventional tire valve that is commonly employed with automobile tires to effect the inflation thereof. In addition, preferably a pressure gauge 102 and 104 operable to measure the pressure of the air in the inflatable rims 70a and 72a is associated with the air valve means 98 and 100, respectively.

The inflation means 97 of the plug means 64 is similar both in function and in construction to the inflation means illustrated in FIG. 4 of the drawing with which the plug means 22 is provided. The only essential difference therebetween is that in the case of the inflation means 97, the air valve means 100 thereof is of sufficient length so as to be capable of protruding through the frame member 66 whereby to be rendered accessible from the interior of the steam generator when the frame member 66 and 68 are in mounted position within the inlet nozzle 95. As in the case of the inflation means employed with the plug means 22, the source of air for inflating the inflatable rims 70a and 72a is preferably a conventional portable bicycle tire pump of sufficient size as to be capable of being carried into the interior of a steam generator for use therewithin in accomplishing the inflation of the rims 70a and 72a.

For purposes of securing the frame members 66 and 68 in place in blocking relation within the inlet nozzle 95, quick disconnect fasteners 106 and 108, respectively, are employed. The fasteners 106 and 108 are identical in construction and in function to the fasteners 58 referred to in the foregoing description that are used to secure the frame member 26 in the nozzle 24. The fasteners 106 and 108 are suitably received within the bosses 110 and 112, respectively, with which the frame members 66 and 68 are provided. Preferably, the bosses 110 and 112 are equally distantly spaced around the circumference of the frame members 66 and 68, respectively. In addition, openings 114 and 116 are provided in the side wall surfaces of the nozzle 95 of suitable dimension so as to be capable of receiving the ends of the fasteners 106 and 108, respectively, therein with a sliding fit. As best understood with reference to FIG. 8 of the drawing, the openings 114 and 116 are preferably suitably spaced one from another as to be operative to cause the frame members 66 and 68 when secured in the nozzle 95 to be slightly spaced one from another. Moreover, it will be seen from FIG. 8 that as illustrated therein when the frame members 66 and 68 are mounted in place relative to the nozzle 95, the resilient members 70 and 72 are operative to establish a liquid tight seal between the inner surfaces of the nozzle 95 and the frame member 66, and the frame member 68, respectively.

The method of employing the plug means 64 is the same as the method of use of the plug means 22 described above. Namely, following drainage of fluid from the steam generator, personnel carrying the frame members 66 and 68 in an unassembled condition enter the interior of the steam generator. Once therewithin, the personnel proceed to assemble the frame members 66 and 68 by effecting the interconnection of the plate sections 74, 76, 78 and the plate sections 80, 82, 84, respectively. Thereafter, the resilient members 70 and 72 are cooperatively associated with the assembled frame members 66 and 68, respectively. Then the frame member 68 followed by the frame member 66 are each secured in mounted relation within the nozzle 95 through the use of the fasteners 108 and 106, respectively. Once the need for the plug means 64 no longer exists, and the nozzles of the steam generator are drained of fluid, the removal of the frame members 66 and 68 from the nozzle 95 can be effected. The steps described above in connection with the installment of the frame members 66 and 68 in the nozzle 95 are simply repeated in reverse order. Finally, with the frame members 66 and 68 each in an unassembled state, they are removed by the personnel from the interior of the steam generator.

Figure 10:
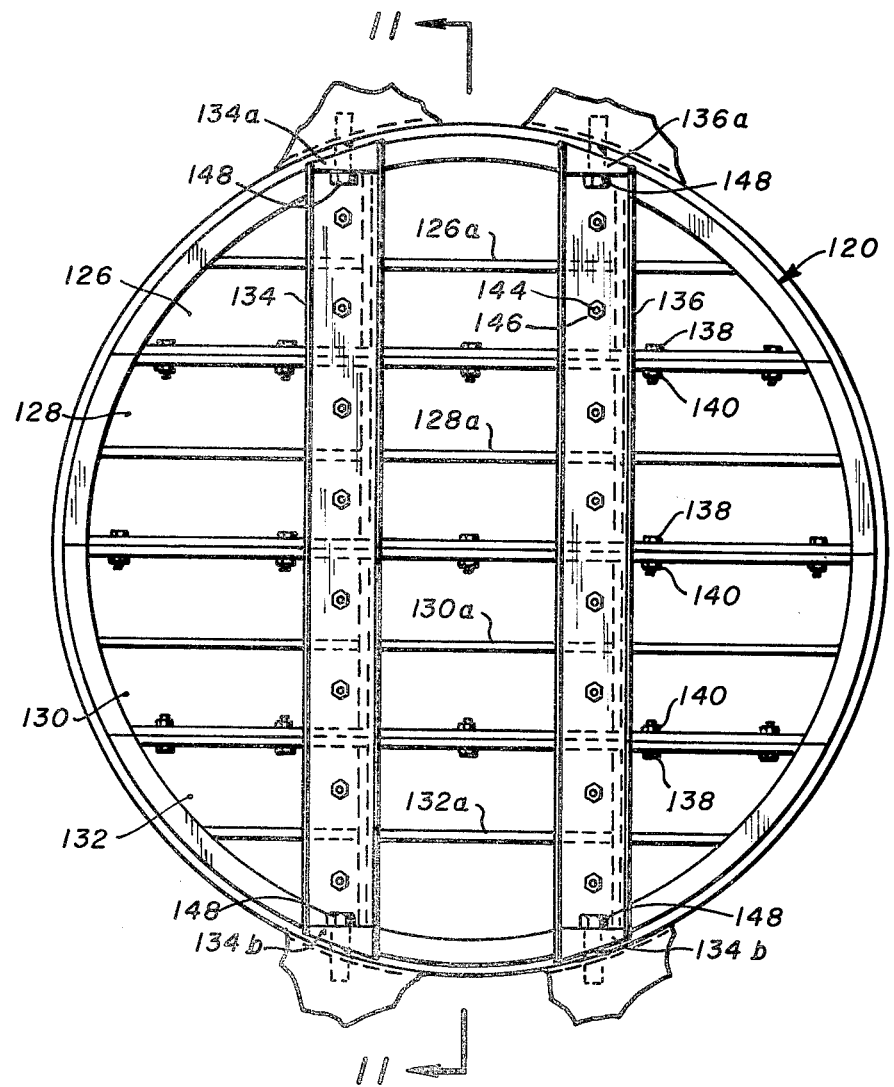
FIG. 10 is a top plan view of a third embodiment of plug means constructed in accordance with the present invention.
Figure 11:
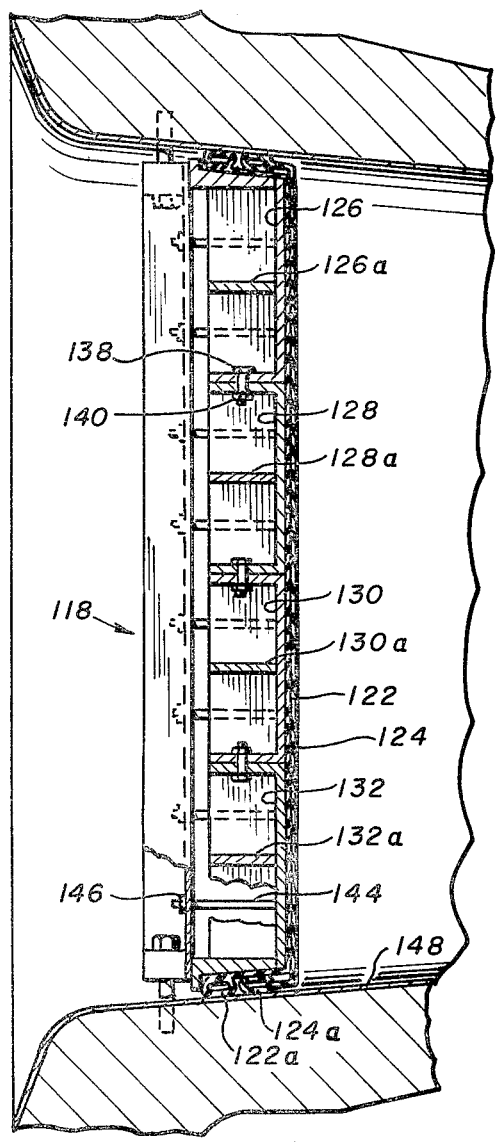
FIG. 11 is a cross-sectional view of the plug means of FIG. 10 taken substantially along the line 11—11 in FIG. 10, and illustrated mounted within a nozzle of a steam generator.

Turning now to a consideration of FIGS. 10 and 11 of the drawing, there is illustrated therein a further embodiment in accordance with the present invention of plug means, generally designated by reference numeral 118. The plug means 118 insofar as it embodies a frame means including a frame member 120 and an inflatable means comprising a pair of resilient members 122 and 124 is generally similar in construction and identical in function to the plug means 22, which as previously noted herein is considered to constitute the best mode embodiment of the invention.

As will be best understood with reference to FIG. 10, the frame member 120 includes four sections of plate 126, 128, 130 and 132, which are all interconnectable together to effect the assembly of the frame member 120. Although as illustrated the plate sections 126, 128, 130 and 132 comprise four in number, it is to be understood that a greater or a lesser number of plate sections could be employed without departing from the essence of the invention. The use of the four plate sections 126, 128, 130 and 132 has been found to be particularly suited for applications wherein the plug means 118 is designed to be employed to effect a temporary liquid tight blockage of an inlet nozzle having a diameter of forty-two inches of a steam generator. For other applications wherein the passage to be blocked is of a smaller diameter, a lesser number of plate sections is desirably employed.

Each of the plate sections 126, 128, 130 and 132 embodies curved portions, which are effective to give the frame member 120 a generally circular configuration when the latter is in assembled condition. Moreover, the plate sections 126, 128, 130 and 132 preferably each include a planar base portion and upstanding side walls which together serve to provide each of the plate sections 126, 128, 130 and 132 with a configuration that generally resembles that of a closed, cup like structure. Finally, each of the plate sections 126, 128, 130 and 132 is provided in accordance with the illustrated embodiment thereof with a longitudinally extending rib member 126a, 128a, 130a and 132a, respectively, which is suitably located so as to be substantially centrally positioned relative to the side walls of the corresponding plate sections 126, 128, 130 or 132. The rib members 126a, 128a, 130a and 132a perform a dual function; namely, they function to provide the plate sections 126, 128, 130 and 132 with additional rigidity as well as serving as a support for a pair of cross pieces 134 and 136 to which further reference will be had subsequently.

For purposes of effecting the assembly of the frame member 120, the latter is provided with interconnecting means consisting of a multiplicity of threaded fasteners 138 and cooperating threaded nuts 140.

More specifically, each of the plate sections 126, 128, 130 and 132 is provided with a plurality of suitably spaced, alignable openings (not shown) suitably dimensioned so as to be capable of receiving therein the fasteners 138. To effect the assembly of the frame means 120, the plate sections 126, 128, 130 and 132 are placed in adjoining relation so that the openings (not shown) therein are aligned. Then, the fasteners 138 are inserted in the aforesaid openings (not shown) and are secured therein through the use of the nuts 140, which are threadily engaged on the fasteners 138 and thereafter tightened relative thereto.

To complete the assembly of the frame member 120, the resilient members 122 and 124 are mounted thereon. The latter members 122 and 124 are of suitable dimension so as to be mountable on the frame member 120 with a friction fit. By virtue of the fact that the members 122 and 124 cover the entire bottom surface of the frame member 120 when mounted thereon, the former are operative to prevent liquid from leaking through the frame member 120 at the joints existing between adjoining ones of the plate sections 126, 128, 130 and 132. Each of the resilient members 122 and 124, as best understood with reference to FIG. 11, terminates in a circumferentially extending inflatable bead, i.e., rim 122a and 124a, respectively. The inflatable rims 122a and 124a are similar in construction and identical in function to the inflatable rims of the resilient members that are embodied in the plug means 22 and 64 previously described hereinbefore. Namely, the inflatable rims 122a and 124a are suitably configured so as to be cooperable with the external surfaces of the frame member 120 and the internal surface of the nozzle 142, when positioned therebetween as depicted in FIG. 11 of the drawing, whereby to be effective in establishing a liquid tight seal between the frame member 120 and the nozzle 142.

Although not shown in the drawing, for purposes of effecting the inflation of the rims 122a and 124a, the latter are preferably provided with inflation means including air valve means identical in construction and in function to the air valve means 40 and 42 with which the plug means 22 is provided. Similarly, pressure gauges (not shown) of a conventional construction are also preferably cooperatively associated with such air valve means to provide a means for measuring the pressure of the air in the rims 122a and 124a. Finally, the air needed to inflate the rims 122a and 124a is preferably provided from a conventional bicycle tire pump.

The final component of the plug means 118 yet to be described is the securing means, which is utilized to effect the installation of the plug means 118 in the nozzle 142. The aforesaid securing means includes the previously mentioned cross pieces 134 and 136. The latter each comprises an elongated member that is suitably secured, in spanning relation thereto, to the plate section 126, 128, 130 and 132 by means of conventionally threaded fasteners 144 that have threaded nuts 146 threadily engaged thereon. The cross pieces 134 and 136 are provided at each end thereof with a boss 134a, 134b and 136a, 136b, respectively. The latter bosses 134a, 134b, 136a and 136b each have an opening (not shown) formed therethrough, which is suitably dimensioned so as to be capable of receiving a threaded fastener 148 therein. The latter fasteners 148 in turn are designed to be received in threaded engagement in threaded openings (not shown) provided for this purpose in the side walls of the nozzle 142.

The method of employing the plug means 118 is the same as the method of use of the plug means 22 and 64 described above. Namely, following drainage of fluid from the steam generator, personnel carrying the frame member 120 in an unassembled condition enter the interior of the steam generator. Once therewithin, the personnel proceed to assemble the frame member 120 by effecting the interconnection of the plate sections 126, 128, 130 and 132. Thereafter, the cross pieces 134 and 136 are secured to the plate sections 126, 128, 130 and 132, and the resilient members 122 and 124 are cooperatively associated with the assembled frame member 120. Then the frame member 120 is secured in mounted relation within the nozzle 142 as shown in FIG. 11 through the use of the fasteners 148. Once the need for the plug means 118 no longer exists, and the nozzles of the steam generator have once again been drained of fluid, the removal of the frame member 120 from the nozzle 142 can be effected. To accomplish this, the steps recited above are simply repeated in reverse order. Finally, with the frame member 120 in an unassembled state, it may be removed by the personnel from the interior of the steam generator.

Thus, in accordance with the present invention there has been provided a novel and improved plug means of the type that is suitable for use in a passage to effect the blockage of liquid therethrough. Moreover, the subject plug means of the present invention is particularly suited to being utilized for purposes of effecting a liquid tight sealing of the inlet nozzle and/or the outlet nozzle of a steam generator of the type that is employable with a nuclear reactor in a nuclear power generating system of conventional design. In addition, in accord with the present invention a plug means is provided, which can be readily disassembled so as to permit its passage through an opening of limited dimensions through which entry to the interior of the steam generator is normally effected by personnel. Further, the plug means of the present invention is readily capable of being secured in a blocking position relative to the inlet nozzle and/or the outlet nozzle of the steam generator within the time it takes to remove the head of the reactor pressure vessel, and thereafter is capable of being removed from its blocking position within the time it takes to replace the head on the reactor vessel. Additionally, in accordance with the present invention a plug means is provided, which is capable of being mounted in a blocking position so as to effect a liquid tight sealing of the inlet nozzle and/or the outlet nozzle of the steam generator in such a manner as to render it relatively unlikely that the plug means will become accidentally dislodged by virtue of its being struck by personnel working inside the steam generator. Also, the plug means of the present invention is characterized by the fact that it is mountable in such a manner relative to the inlet nozzle and the outlet nozzle of the steam generator that the fluid being blocked thereby exerts a force thereagainst tending to urge the plug means into a blocking position. Finally, in accord with the present invention a plug means is provided that is relatively economical to manufacture, relatively easy to employ, and is capable of providing reliable operation.

While several embodiments of my invention have been shown, it will be appreciated that modifications thereof, some of which have been alluded to hereinabove, may still be readily made thereto by those skilled in the art. I, therefore, intend by the appended claims to cover the modifications alluded to herein as well as all other modifications, which fall within the true spirit and scope of my invention.

I claim:

1. A plug means operative to effect a temporary blockage of a nozzle having a passage formed therein defined by the internal surface of the nozzle so as to prevent the flow of liquid through the passage in the nozzle comprising:
    (a.) a plurality of interconnectable sections of plate having a first and a second state of assembly, said first state of assembly corresponding to the unassembled condition of said purality of interconnectable sections of plate, when in said unassembled condition each of said plurality of interconnectable sections of plate being of sufficiently small size so as to be insertable within the passage, said second state of assembly corresponding to the assembled condition of said plurality of interconnectable sections of plate, when in said assembled condition said plurality of interconnectable sections of plate embodying a cross-sectional area substantially the same as the cross-sectional area of the passage, each of said plurality of interconnectable sections of plate embodying a plurality of surfaces, first means formed in one of said plurality of surfaces of each of said plurality of interconnectable sections of plate, second means formed in another of said plurality of surfaces of each of said plurality of interconnectable sections of plate;
    (b.) a member formed of a leakproof material and embodying a rim in the form of an inflatable bead, when said plurality of interconnectable sections of plate are in said assembled condition thereof said member being placed in mounted relation on said plurality of interconnectable sections of plate thereby to effect a liquid tight seal of said plurality of interconnectable sections of plate when said plurality of interconnectable sections of plate are in said assembled condition thereof;
    (c.) interconnecting means for effecting the interconnection of said plurality of interconnectable sections of plate so as to effect the assembly of said plurality of interconnectable sections of plate into said assembled condition thereof, said interconnecting means comprising a first plurality of fasteners, said first plurality of fasteners when received in said first means of said plurality of interconnectable sections of plate being operative to effect the interconnection of adjoining ones of said plurality of interconnectable sections of plate;
    (d.) securing means for securing said plurality of interconnectable sections of plate when in said assembled condition thereof within the passage in blocking relation to the flow of liquid therethrough, said securing means comprising a second plurality of fasteners, said second plurality of fasteners when received in said second means of said plurality of interconnectable sections of plate being operative to secure said plurality of interconnectable sections of plate in place within the passage such that said plurality of interconnectable sections of plate are prevented from moving relative to the internal surface of the nozzle; and
    (e.) inflation means connected to said inflatable bead of said member and also connectable to an external source of an inflation medium, said inflation means being operative to inflate said inflatable bead when said plurality of interconnectable sections of plate are secured in the passage by said second plurality of fasteners such as to effect the establishment of a liquid tight seal between said inflatable bead of said member and the passage defined by the internal surface of the nozzle so as to thereby accomplish a temporary blockage of the flow of liquid through the passage in the nozzle.

2. The plug means as set forth in claim 1 wherein said plurality of interconnectable sections of plate includes at least three sections of plate.

3. The plug means as set forth in claim 2 wherein at least two of said three sections of plate are semi-circular in configuration.

4. The plug means as set forth in claim 1 wherein said inflation means includes at least an air valve means connected to said inflatable bead and connectable to an external air supply.

5. The plug means as set forth in claim 4 wherein said inflation means further includes a pressure gauge cooperatively associated with said air valve means for measuring the pressure of the air within said inflatable bead.

6. The plug means as set forth in claim 1 further including a second member embodying a rim in the form of an inflatable bead, said second member also being placed in mounted relation on said plurality of interconnectable sections of plate when said plurality of interconnectable sections of plate are in said assembled condition thereof.

7. The plug means as set forth in claim 6 wherein said inflation means includes a pair of air valve means, each of said pair of air valve means being connected to a corresponding one of said inflatable beads of said member and said second member and being connectable to an external air supply.

8. The plug means as set forth in claim 7 wherein said inflation means further includes a pair of pressure gauges, each of said pair of pressure gauges being cooperatively assocaited with one of said pair of air valve means for measuring the pressure of the air in said inflatable bead to which said one of said pair of air valve means is connected.

* * * * *